C. C. EVANS.
DRIVING AXLE HUB CONSTRUCTION FOR MOTOR DRIVEN VEHICLES.
APPLICATION FILED SEPT. 13, 1917.
1,275,143.  Patented Aug. 6, 1918.
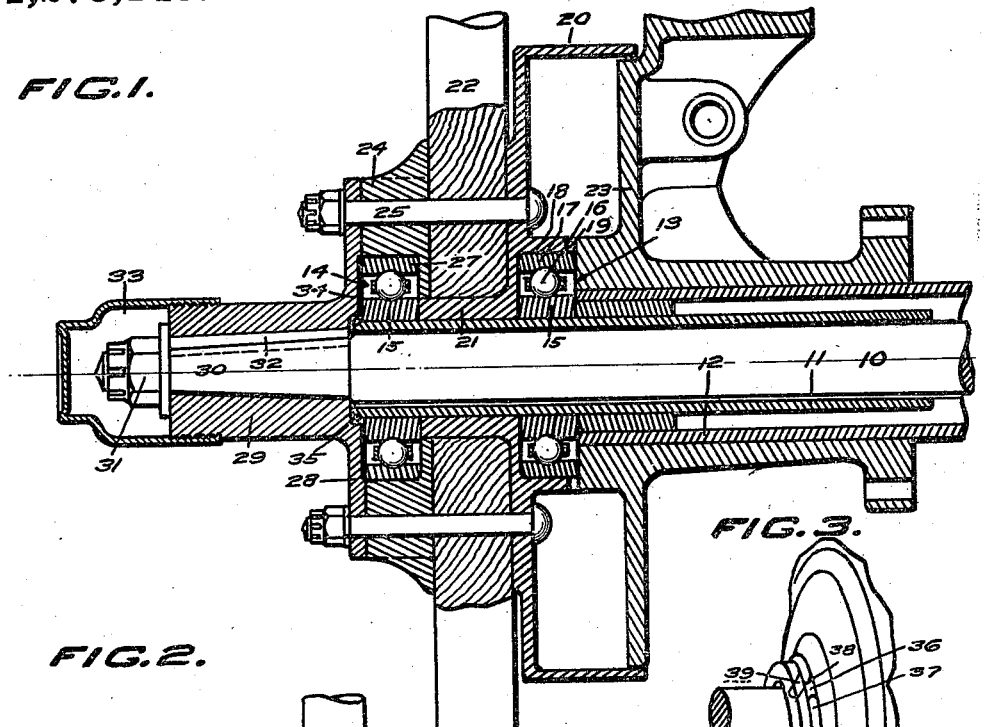
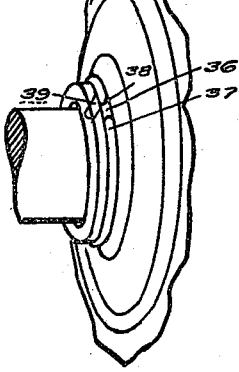
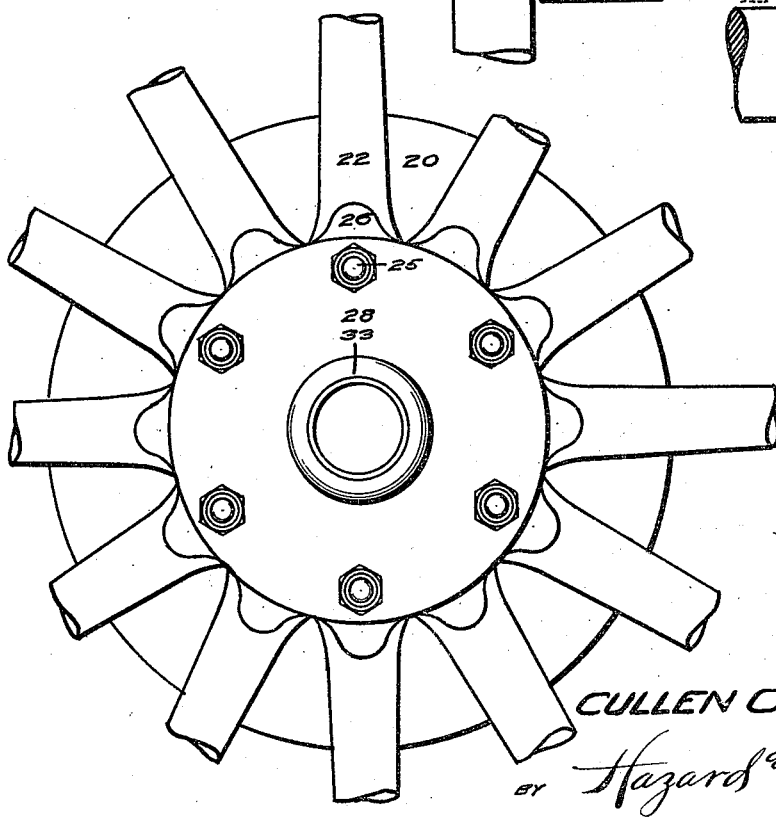
INVENTOR
CULLEN C. EVANS.
BY Hazard & Miller
ATT'YS

UNITED STATES PATENT OFFICE.

CULLEN C. EVANS, OF LOS ANGELES, CALIFORNIA, ASSIGNOR TO MASTER EQUIPMENT COMPANY, OF LOS ANGELES, CALIFORNIA, A CORPORATION OF CALIFORNIA.

DRIVING-AXLE-HUB CONSTRUCTION FOR MOTOR-DRIVEN VEHICLES.

1,275,143.  Specification of Letters Patent.  Patented Aug. 6, 1918.

Application filed September 13, 1917. Serial No. 191,301.

*To all whom it may concern:*

Be it known that I, CULLEN C. EVANS, a citizen of the United States, residing at Los Angeles, in the county of Los Angeles and State of California, have invented new and useful Improvements in Driving-Axle-Hub Constructions for Motor-Driven Vehicles, of which the following is a specification.

This invention relates to an automobile axle and particularly pertains to the hub construction of a driving axle.

It is the principal object of this invention to provide a replacement hub adapted to be mounted upon motor vehicle driving axles of light construction to convert them into strong axles which will withstand heavy use, the invention particularly pertaining to means for converting a pleasure car axle into a truck axle.

Another object of this invention is to provide an interchangeable hub and brake-drum which may be readily mounted upon driving axle housings of certain types, and simply connected with the driving axle.

Other objects will appear hereinafter.

The invention is illustrated, by way of example, in the accompanying drawings in which:

Figure 1 is a view in longitudinal section and elevation disclosing the detail construction of one of the axle hubs and the manner in which it is mounted in connection with its housing.

Fig. 2 is a fragmentary view in elevation illustrating the end of the hub and the auxiliary bolting flange provided therefor.

Fig. 3 is a fragmentary view in perspective illustrating the safety ring which prevents the wheel from running off the axle when the axle is broken.

Referring more particularly to the drawings, 10 indicates a motor vehicle driving axle which is mounted within an axle bushing 11. This bushing is secured in a suitable manner within the end of an axle housing 12. The bushing 11 extends outwardly from the squared end of the housing a considerable distance to receive anti-friction bearings 13 and 14. These bearings are formed with inner ball races 15 mounted upon the bushing and around which are disposed bearing balls 16. An outer ball race 17 circumscribes the bearing balls. As here shown, the ball bearings are both of substantially the same dimensions. The inner bearing is mounted within a bearing cup 18 formed concentrically of a hub 19 which is a part of a cast brake-drum 20. An outwardly extending hub portion 21 of the brake-drum is provided with a reduced bore substantially the outside diameter of the bushing 11. The outer diameter of this portion of the hub is also considerably smaller than the outer diameter of the inwardly extending portion 19 and thereby forms a seat for wheel spokes 22 which are arranged around the hub, as particularly shown in Fig. 2 of the drawings.

The inner face of the hub extension 19 substantially bears against the outer end of a brake spider hub 23 which is shrunk upon the end of the housing 12. This spider may be of any particular design to support a brake-band and actuating mechanism therefor and hold it in operative position in relation to the brake-drum 20.

The spokes 22 which are mounted around the outer extension of the brake-drum 21 are held in position by a bolting flange 24 and bolts 25. The bolting flange is of special design, being extremely thick and having ears 26 which extend radially from the flange and register with the outer face of each spoke as particularly shown in Fig. 2. This flange is formed with a bearing counterbore 27 within which the anti-friction bearing 14 is mounted. A reduced central bore of the bolting flange fits around the end of the brake-drum hub portion 21 and centrally locates it. The bolts 25 also pass through a circular flange 28 formed as a part of the original wheel hub 29 and within which the tapered end 30 of the axle 10 is secured. As here shown, this hub is solid with a tapered bore through it within which the end of the axle is secured by a castellated nut 31. A key 32 holds the hub in fixed relation to the axle. The outer end of the hub is externally threaded to receive a dust-cap 33 with which the original wheel was fitted.

Reference being had to Fig. 1 it will be seen that the inner face of the hub bolting flange 28 is formed with two counterbores, one being a shallow counterbore 34 of large diameter which is adapted to bear down upon the outer ball race 17 of bearing 14. A smaller counterbore 35 is deeper than the first-named one and accommodates the outer extending end of the axle bushing 11.

Reference being had particularly to Fig. 3, it will be seen that the end of the axle bushing 11 is formed with a shallow circumferential groove 36 within which an annular lock ring 37 is adapted to be seated. This ring is formed of circular stock and its diameter is considerably greater than the depth of the groove within which it is positioned. A radially extending bore 38 is formed from a point along said groove to receive inturned end 39 of the ring. This ring is made of spring steel and when in position, as shown, will not be accidentally displaced. The purpose of the ring is to prevent bearings 13 and 14 and the hub 21 from slipping off the axle bushing 11 in case the axle becomes broken.

In operation, the axle housing upon which the hub here shown is to be fitted is prepared by squaring up its ends to a desired length, after which a bushing 11 is securely fixed within each end of the housing. A brake spider may then be swung in position. The anti-friction bearing 13 is then slipped over the extending end of the bushing 11 to receive the brake-drum 20 upon which has previously been assembled the spokes and the bolting flange 24. The bearing 14 is then slipped in the bore of the bolting flange 24, and the axle hub 29 with its driving axle 10 fixed in operative position. A load supported by the axle will be directly carried upon the strong bearings 13 and 14 and within the brake hub and bolting flange. Due to this construction the axle will be relieved of undue strain at the ends of the housing and the retaining ring 37 will prevent the wheel from running off in case the axle should become fractured.

It will thus be seen that by the use of this hub construction, axles of light design may readily be converted for heavy duty use and also that the wheels will not run off at the ends of the axle housing when the driving axles are broken.

While I have shown the preferred construction of my driving axle hub construction for motor driven vehicles as now known to me, it will be understood that various changes in the combination, construction and arrangement of parts may be made by those skilled in the art without departing from the spirit of my invention as claimed.

I claim:

1. A hub construction for motor vehicle driving axles comprising a tubular bushing fixed in the end of an axle housing and extending outwardly therefrom, a bearing mounted upon the bushing, a brake drum rotatably disposed upon said bearing and to which a wheel may be secured, a bolting flange secured against the wheel and rotatably supported upon the bearing of the bushing, and a driving connection securing the wheel and drum to a vehicle axle extending through the bushing and into the housing.

2. A hub construction for motor vehicle driving axles comprising a tubular bushing fixed in the end of an axle housing and extending outwardly therefrom, a bearing mounted upon the bushing, a brake drum rotatably disposed upon said bearing and to which a wheel may be secured, a bolting flange secured against the wheel and rotatably supported upon the bearing, a driving connection securing the wheel and drum to a vehicle axle extending through the bushing and into the housing, and means for supporting the wheel and drum upon the bushing independent of the driving axle.

3. In a hub construction for motor vehicle driving axles, the combination with an axle housing, of a tubular bushing fixed in the end thereof and extending outwardly therefrom, a driving axle extending through said bushing, a driving hub fixed to the outwardly extending end of said axle, a vehicle wheel secured to said hub, a bolting flange interposed between the wheel and hub, a brake-drum secured upon the opposite side of the wheel and adapted to rotate therewith, and anti-friction bearings mounted within the hub of the brake-drum and the bolting flange to rotatably support the wheel upon the tubular bushing.

4. In a hub constructed for motor vehicle driving axles, the combination with an axle housing, of a tubular bushing fixed in the end thereof and extending outwardly therefrom, a driving axle extending through said bushing, a driving hub fixed to the outwardly extending end of said axle, a vehicle wheel secured to said hub, a bolting flange interposed between the wheel and hub, a brake-drum secured upon the opposite side of the wheel and adapted to rotate therewith, anti-friction bearings mounted within the hub of the brake-drum and the bolting flange to rotatably support the wheel upon the tubular bushing, and detachable fastening means adapted to be disposed upon the end of the tubular bushing to prevent accidental displacement of the bearings and wheel rotatably mounted thereon.

In testimony whereof I have signed my name to this specification.

CULLEN C. EVANS.